Dec. 27, 1932.  D. M. BERNOTOW  1,891,908
MEANS FOR AND METHOD OF HANDLING CANDY GOODS
Filed Jan. 11, 1930  4 Sheets-Sheet 4
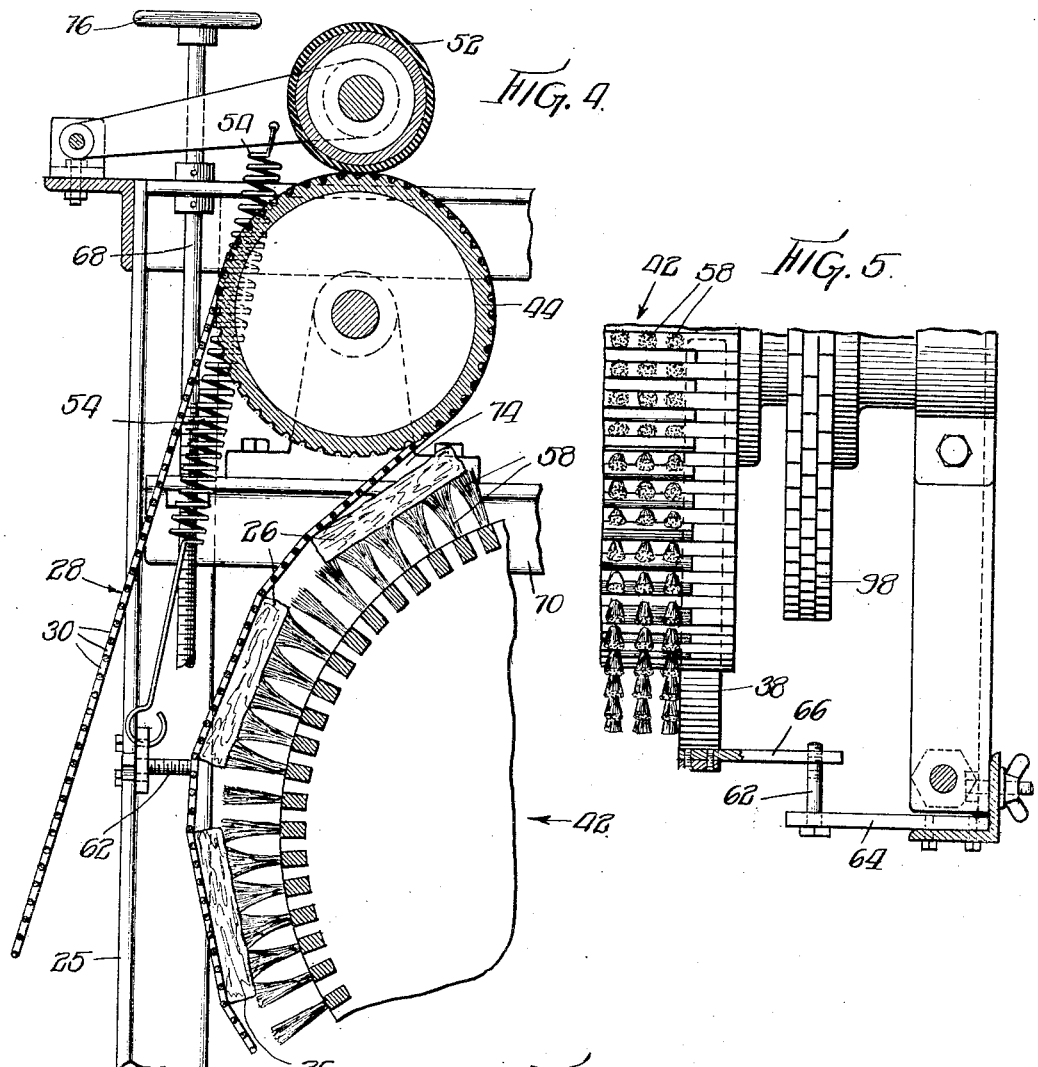
INVENTOR:-
DOMINICK M. BERNOTOW
BY Cheever, Cox + Moore
ATTYS Patented Dec. 27, 1932

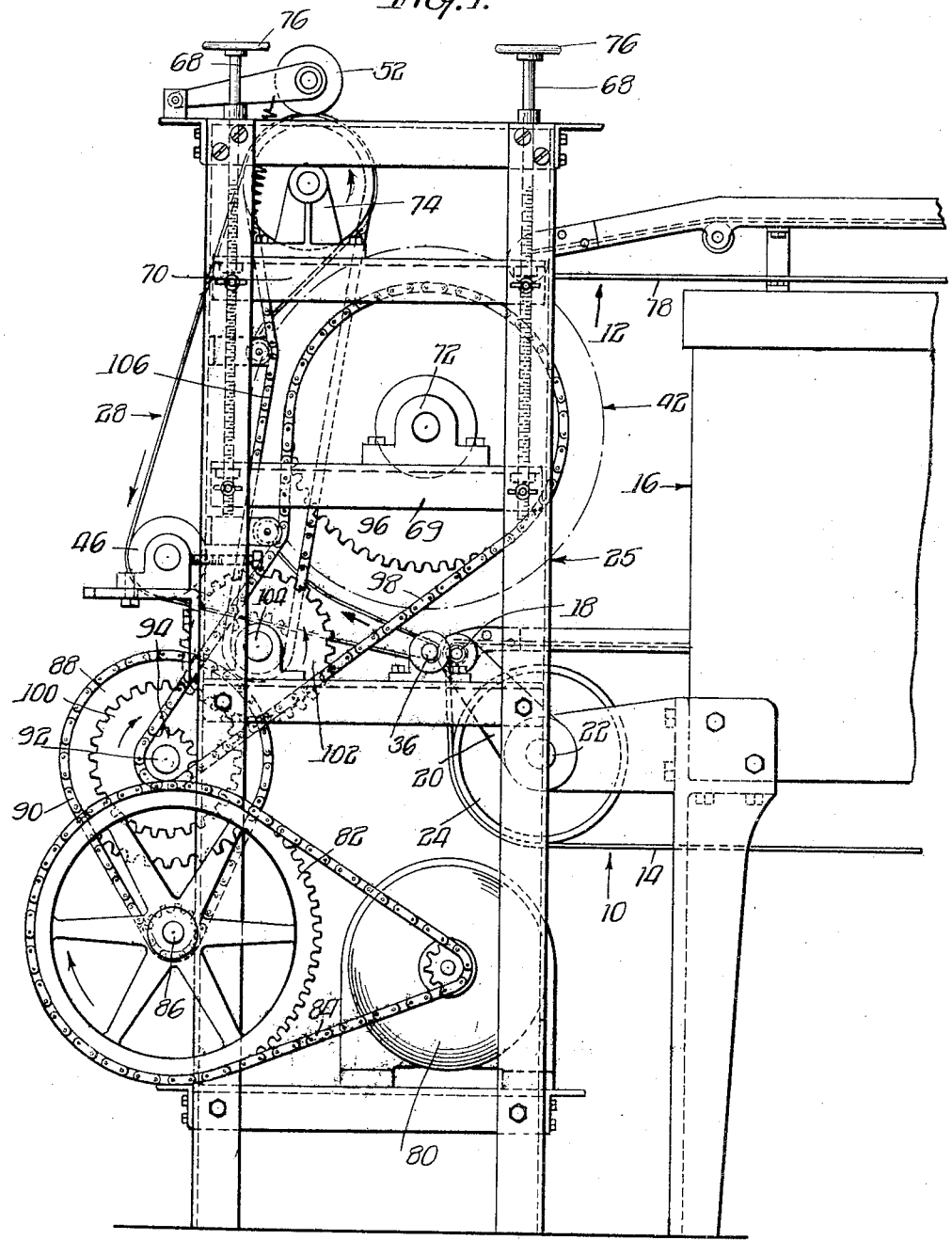

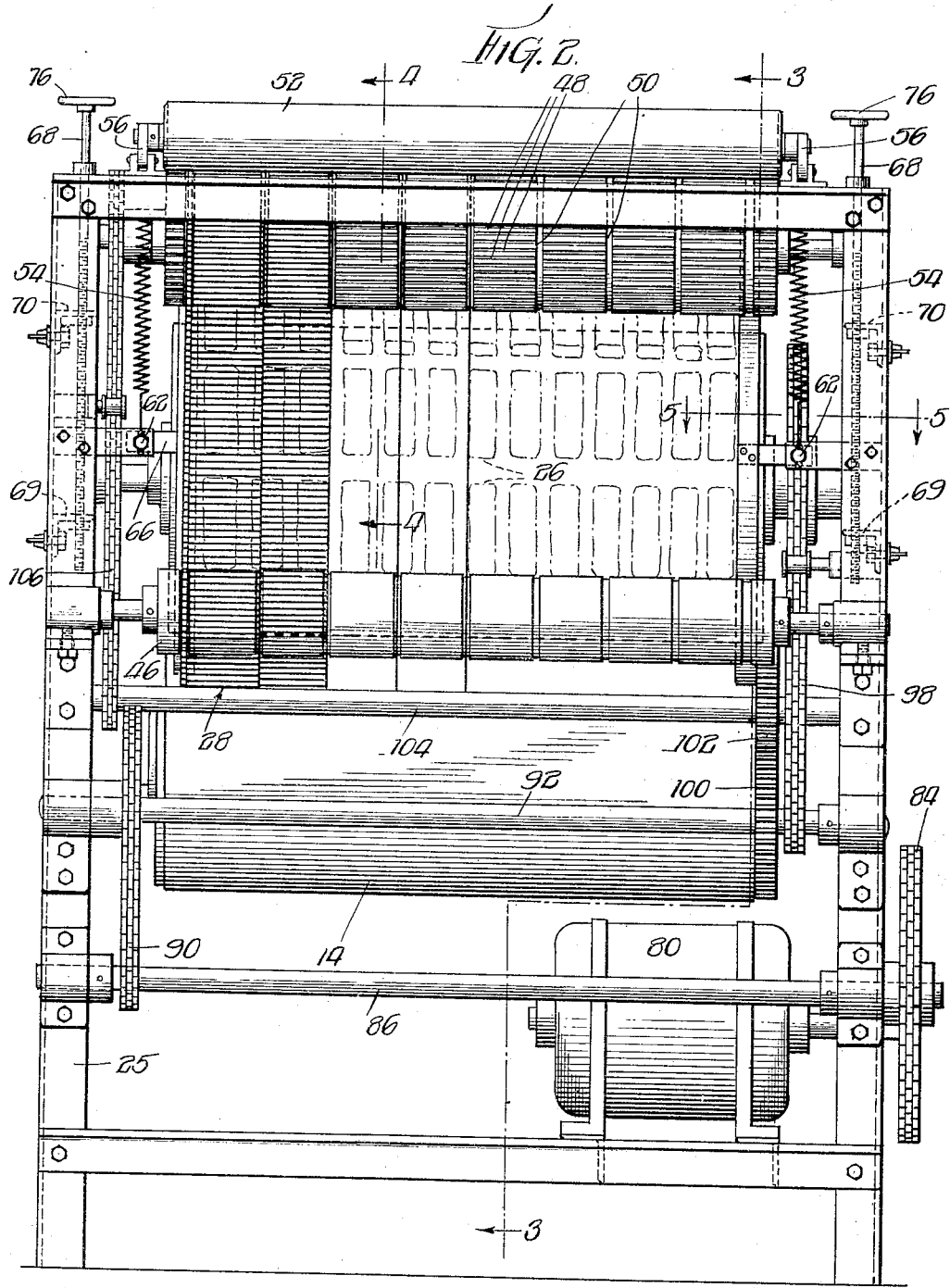

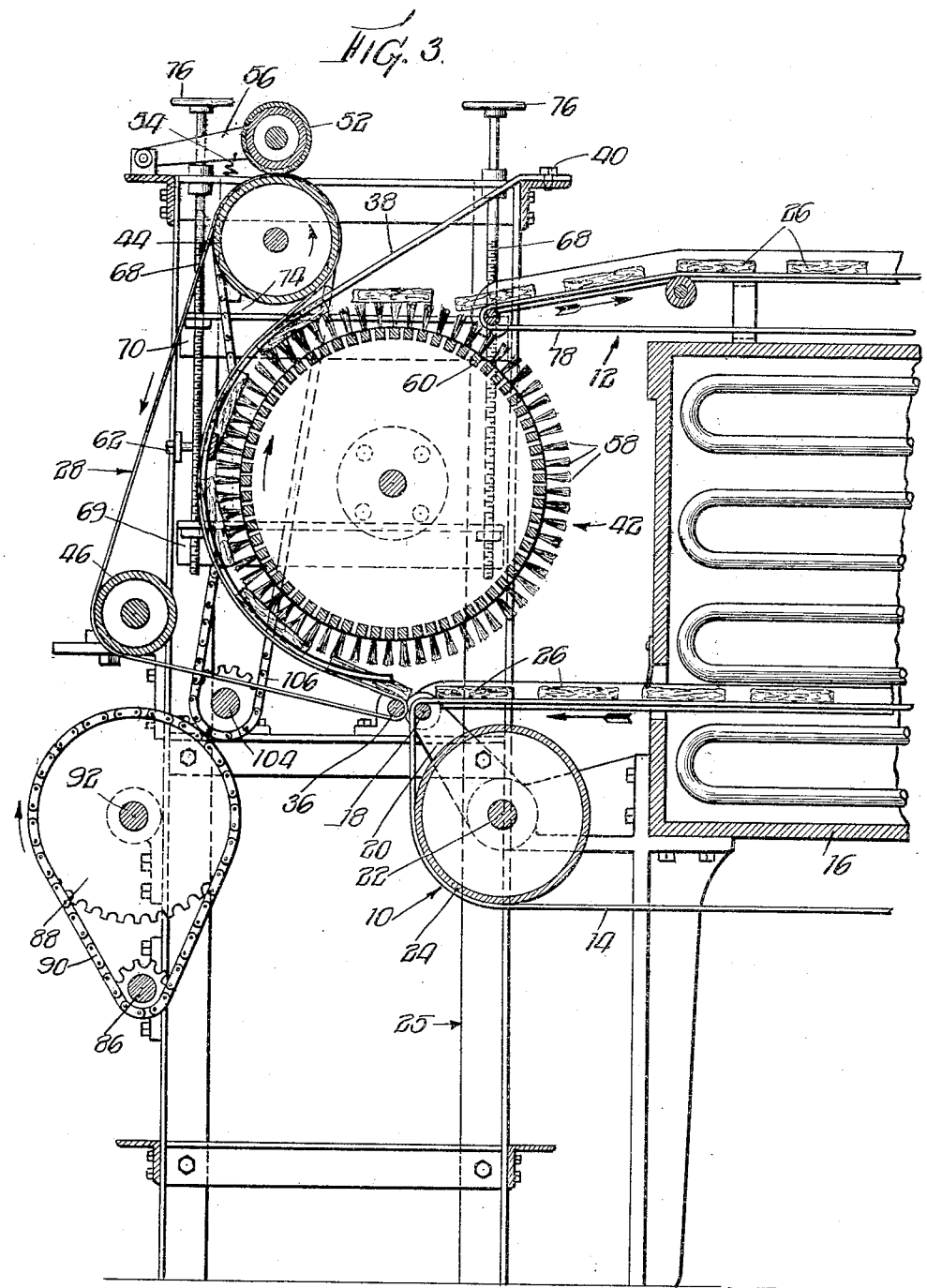

1,891,908

UNITED STATES PATENT OFFICE

DOMINICK M. BERNOTOW, OF CHICAGO, ILLINOIS, ASSIGNOR TO BUNTE BROTHERS, OF CHICAGO, ILLINOIS, A CORPORATION OF ILLINOIS

MEANS FOR AND METHOD OF HANDLING CANDY GOODS

Application filed January 11, 1930. Serial No. 420,250.

My invention relates generally to conveyor mechanisms and more particularly to conveyor devices which are adapted to be used for feeding or conveying candy materials and goods of like nature.

One of the problems which confront certain manufacturers, and particularly manufacturers of candy goods is that of expeditiously transporting or conveying said goods from one position to another in the factory. Heretofore, it has required considerable valuable floor space to shift, candy bars for example from one coating or dipping machine to another and it has also, in some instances, necessitated considerable handling of the goods. Thus, in using the conventional types of endless conveyors it has been the practice to place the dipped candy goods upon one end of said conveyor and one or more attendants positioned at the opposite end of the conveyor removes the goods and places them in a receptacle. When this receptacle is filled it is manually transported to another machine where the bars are again subjected to a dipping operation.

It is one of the primary objects of my present invention to overcome the above mentioned and numerous other difficulties which have heretofore been experienced in handling materials such as candy goods and the like, and to accomplish this I propose to provide a machine of improved, practical construction whereby a unique and simple method of conveying the goods may be effectively practiced.

Another object of my invention is to provide methods and apparatus whereby candy materials or other materials having similar characteristics may be conveyed from one location in the factory to another without subjecting the goods to the potential hazards of breakage and disfigurement.

Still another object of my invention is to provide means whereby goods such as confections may be moved along a predetermined substantially horizontal path and then automatically shifted to another plane and moved in a reverse direction in a substantially horizontal path in said plane without subjecting the goods to any surface disfigurement.

A further object of my present invention is to enable the goods to be moved in a given direction along a predetermined path and automatically shifted to another path in an inverted position and then moved in a reverse direction along said second path.

More specifically, my invention contemplates the provision of a novel rotary means for receiving the goods which is being conveyed toward it, said rotary means serving to move the goods along an arcuate path and then deliver the goods to means for conveying it in another direction.

A still more specific object of my present invention is to provide a flexible engaging means which cooperates with the above mentioned rotary means in effectively shifting the goods from one path of movement to another.

The above mentioned and numerous other objects and advantages will be more apparent from the description which is to follow. In accordance with the general features of the invention one embodiment consists in a pair of substantially horizontally disposed endless conveyors, one being spaced directly above the other. The upper section of the lower conveyor is adapted to move candy goods or the like along a predetermined path to a point immediately below the periphery of a rotary drum. This drum is provided along its periphery with a plurality of soft bristles. As the candy reaches the end of the lower conveyor it is delivered to another endless conveyor means which consists of a plurality of wire links. These links present a mesh-like structure which gently bears against one side of the candy and causes the opposite side of the candy to bear against the soft bristles. The frictional engagement of the mesh and the bristles with the candy is sufficient to cause the same to be moved upwardly in an arcuate path and finally to be delivered in an inverted position to the upper endless conveyor without subjecting said candy to the slightest possibility of breakage. In this manner the candy is moved in a reverse direction along the path determined by the upper conveyor.

In the drawings:

Figure 1 is a side elevational view of a machine which is representative of one embodiment of my invention and by means of which my improved method of handling candy goods and the like may be effectively practiced;

Figure 2 is a front elevational view of the machine as viewed from the left of Figure 1, with only a portion of the candy engaging mesh being shown in order to more clearly disclose parts which would otherwise be hidden;

Figure 3 is a vertical sectional view taken substantially along the line 3—3 of Figure 2;

Figure 4 is an enlarged fragmentary vertical sectional view taken substantially along the line 4—4 of Figure 2 to more clearly disclose the manner in which the candy material is moved by the rotary means or drum;

Figure 5 is an enlarged horizontal fragmentary section taken substantially along the line 5—5 of Figure 2; and Figure 6 is an enlarged detailed view of the mesh-like endless conveyor means which cooperates with the brushes or bristles on the drum in moving the goods.

Referring now to the drawings more in detail wherein like numerals have been employed throughout the various figures to designate similar parts, it will be observed that one embodiment of the invention includes a lower endless conveyor means which I have designated generally by the numeral 10 and an upper conveyor means 12. The lower conveyor 10 includes an endles belt 14, the upper reach of which passes through a refrigerator 16 in the direction indicated by the arrow in Figure 3. The upper reach of the belt 14 moves horizontally to a point where it passes over and downward from a guide roll 18 which is carried at the outer extremities of angularly adjustable arms 20. The arms are mounted upon opposite extremities of a shaft 22 which supports a guide roll 24 for receiving the belt as it passes downwardly from the roll or shaft 18. This shaft 22 is mounted within upright sections of a machine frame 25. As candy material, which I have shown in the drawings as bars 26, reaches the forward end of the conveyor 10, it is delivered to another endless conveyor 28.

This endless conveyor 28 comprises a plurality of wire links 30 which are clearly shown in Figure 6. Each link 30 extends from one side of the machine to the other and includes a plurality of U-shaped sections made up of elongated horizontal portions 32 and relatively short link sections 34. Referring to Figure 3, it will be seen that this endless mesh-like conveyor 28 passes upwardly and over a guide shaft 36 so as to receive the candy bars 26 from the conveyor 10. A pair of spaced arcuate guide bars 38 which are secured at their upper extremities to the frame 25 by means of bolts 40, serve to guide the conveyor 28 in proper spaced relation with respect to a rotary feeding means 42, about to be described. As the mesh-like conveyor 28 leaves the guide bars 38, it passes over a positively driven roll or drum 44 and then downwardly and under an idler roll 46. The driven roll or drum 44 is provided with a plurality of longitudinal grooves 48 (Figure 2) for receiving the sections 32 of the links 30 and a plurality of circumferential grooves 50 for accommodating the links sections 34. To further insure the meshing of the links 30 with the drum 44 I provide an idler roll 52 which bears downwardly upon the drum 44 through the action of coil springs 54 which are interposed between pivotally mounted supporting arms 56 and the machine frame, as clearly shown in Figure 4. I prefer to use cushion-like material such as rubber for the peripheral portions of the rolls 44 and 52 in order to prevent the links 30 from being distorted in response to the driving action of the positively driven roll 44.

Referring now to Figures 3 and 4, it will be seen that the candy bars 26 are advanced by the conveyor 28 into engagement with relatively soft bristles or brushes 58 which are mounted within a drum 60 of the rotary conveyor means 42. The mesh-like conveyor 28 and the bristles 58 engage the opposite sides of the candy bars with sufficient gentleness to positively preclude the possibility of marring or otherwise disfiguring said candy and at the same time impart a tractive force which is sufficient to positively move the bars along a predetermined arcuate path. Both the flexible conveyor 28 and rotary means 42 are positively driven in timed relation by means later to be described, so that there will be no relative movement between the links 30 and the bristles 58. It will be seen from Figure 4 that the flexibility or cushion-like action of the links and bristles is such as to automatically effect conformation of said links and bristles to the particular surface contour of the candy stock and thereby cause the positive, yet gentle advancement thereof. By having this arrangement, goods of varied sizes and shapes may be expeditiously conveyed from the lower conveyor to the upper conveyor or vice versa. In order to adjust the position of the guide bars 38 and thereby properly position the conveyor 28 with respect to the bristles 58, I provide screws 62, Figures 4 and 5. One extremity of these screws extends through a bracket 64 carried by the frame 25 and the opposite extremity of each screw makes a threaded connection with an arm 66 which is riveted to the guide bar 38. Thus, these guide bars may be adjusted so as to properly space the conveyor links 30 from the bristles.

In order to vertically adjust the position of the rotary conveyor means 42, I provide four vertically disposed screws 68, two at each side of the machine frame. A pair of transverse frame members 69 and 70 are adapted to be vertically adjusted by means of the screws 68. The frame members 69 provide the support for bearings 72 (Figure 1) in which the conveyor drum 60 is rotatable. Thus, by manipulating the screws 68, the drum 60 may be vertically adjusted. The screws 68 serve also as a means for vertically adjusting the roll or drum 44 which is mounted in bearings 74, Figure 1, carried by the frame members 70. In this manner the tautness of the flexible conveyor 28 may be adjustably controlled. The screws 68 are provided with suitable hand wheels 76.

As the candy bars are moved away from the conveyor 28 through the action of the bristles 58, they are subsequently delivered to the upper reach of a belt 78 of the conveyor 12. The belt 78 moves in the direction indicated by the arrow in Figure 3 and thus the candy bars which are now inverted, are conveyed in a direction which is reverse to the direction of feed of the lower belt 14.

The driving mechanism for the above described machine includes a motor 80 or other suitable actuator and this motor is connected with a gear 82, Figure 1, by a chain 84. The gear 82 drives a shaft 86, which in turn drives a gear 88 through a chain 90. The gear 88 drives a shaft 92 and a gear 94 at the extremity of the shaft 92 is connected with a large gear 96 by a chain 98. This large gear rotates the shaft which supports the conveyor drum 60. Rotation is imparted to the roll or drum 44 which carries the conveyor 28 through the agency of gears 100 and 102, a shaft 104 and a chain drive 106. The timing is such that the speed of travel of the mesh-like conveyor 28 is equal to the peripheral speed of the rotary conveyor means 42.

From the foregoing description it will be clear that my invention contemplates the provision of an improved, practical device for conveying candy goods and the like. By employing this apparatus, dipped candy may be moved in a given direction through a cooling chamber in one plane, shifted to another plane in an inverted position and then moved in a reverse direction. The practical advantages which flow from this improved construction will be more apparent when it is understood that heretofore it has not been possible to reverse the travel of the candy stock. In other words, my invention makes it possible to use the space above the lower endless conveyor and thereby enables a considerable saving in floor space. As stated above, it has heretofore been necessary for attendants to manually remove the goods as it reached the extremity of the conveyor, place them in a container and then carry them to the second dipping machine. My invention eliminates those steps by automatically shifting the goods from one path to another and in this manner enables said goods to be returned for a second dipping operation. In instances where it is desirable to invert the goods so as to present the same in proper position for a subsequent treating step or for purposes of packing, my invention has a very practical application. The manner in which I have arranged the flexible conveyor 28 and the resilient or cushion-like bristles 58 positively avoids breakage and marring of the goods. This is of particular significance in handling chocolate coated candies and the like. The described device is not limited for use with hard candies but may be used with equal effectiveness for conveying chocolate coated candies having soft centers. This is accomplished by reason of the gentle clamping action of the conveyor 28 coupled with the fact that the links of said conveyor as well as the bristles, are self-conformable to the surface contour of the candy stock. Thus my machine is designed to handle goods which vary in size and shape over a comparatively wide range. While I have preferred to describe my invention in connection with the handling of candy material, it should be understood that said invention is by no means limited to that particular field but may be used in any instances where goods must be conveyed from one point to another and also in instances where the goods are of such a nature that they must be handled delicately.

Having thus described my invention, what I claim as new and desire to secure by Letters Patent is:

1. In a conveyor device of the class described for candy goods and material of like nature, a rotary drum device having a cushion-like peripheral portion for directly engaging and receiving material to be conveyed, and a conveyor means positively movable in timed relation with respect to and adjacent the peripheral portion of said rotary means and adapted to cooperate therewith in conveying material positioned therebetween.

2. In a conveyor device of the class described for shifting candy material and the like from one plane to another, a rotary conveyor drum having a peripheral portion for directly engaging and receiving the material to move it in an arcuate path, and a second conveyor means spaced from and movable in an arcuate path corresponding to said first mentioned conveyor means whereby material positioned between and engaged by said conveyor means may be shifted from a given plane through an arcuate path to another plane spaced from said first mentioned plane.

3. In a conveyor device of the class described for candy and material of like nature, a conveyor means for advancing material along a plane in a given direction, a second conveyor means spaced from said first means for advancing material in another direction, rotary drum conveyor means having a peripheral surface for directly engaging and receiving material from one of said first mentioned conveyor means and delivering said material to the other, whereby to automatically effect a change in direction of the conveyance and the inversion of said material, and candy engaging means movable with and spaced from the periphery of said rotary conveyor means.

4. In a conveyor device of the class described for displacing material from one vertical position to another, a rotary drum having a cushion-like peripheral surface for receiving material, and a flexible conveyor means movable in timed relation with respect to the cushion-like peripheral portion of the rotary means, said flexible conveyor drum being spaced from said peripheral portion so as to enable the material to be frictionally engaged but gently gripped between said flexible and cushion-like parts, and thereby effect the vertical displacement of said material.

5. In a conveyor device of the class described, a rotary means having a plurality of peripherally arranged bristles, said bristles providing a cushion-like material receiving surface, and means spaced from and cooperating with said bristles to hold material in position upon said bristles, thereby effecting the conveyance of said material from one position to another.

6. In a conveyor device of the class described, an endless conveyor for receiving and conveying candy material in a given direction, a rotary conveyor drum mechanism having a cushionlike peripheral portion for receiving and engaging the outer surface of said candy material without causing any disfigurement thereof, a second endless conveyor mechanism for receiving candy material from said first endless conveyor mechanism, said second conveyor mechanism being spaced from and movable in timed relation with a portion of the periphery of said rotary conveyor mechanism and cooperating therewith to hold the candy against the drum periphery and thereby effect the shifting of the candy from the first conveyor mechanism to a vertically displaced position, and a third endless conveyor mechanism adapted to receive the candy material from the peripheral surface of said rotary conveyor mechanism.

7. In a conveyor device of the class described, a rotary conveyor means having a cushionlike peripheral surface for directly receiving and engaging a surface of impressionable material without disfiguring the surface of said material, and a second conveyor mechanism spaced from and movable in timed relation with the peripheral surface of said rotary conveyor mechanism, said second conveyor mechanism being adapted to gently engage a surface of the impressionable material oppositely disposed from the surface engaged by the cushionlike periphery of the rotary conveyor mechanism and hold the impressionable material against said periphery, whereby to effect the displacement of said material from one position to another through an arcuate path without subjecting the surfaces of said material to any disfigurement.

In witness whereof, I have hereunto subscribed my name.

DOMINICK M. BERNOTOW.